(12) United States Patent
Kim et al.

(10) Patent No.: US 6,630,270 B1
(45) Date of Patent: Oct. 7, 2003

(54) LITHIUM ION BATTERY USING PRISMATIC CAN WITH RECESSED SURFACES

(75) Inventors: Soo-Ryoung Kim, Taejeon (KR); Jee-Ho Kim, Taejeon (KR)

(73) Assignee: LG Chemical Ltd (KR)

( * ) Notice: Subject to any disclaimer, the term of this patent is extended or adjusted under 35 U.S.C. 154(b) by 0 days.

(21) Appl. No.: 09/622,744

(22) PCT Filed: Dec. 24, 1999

(86) PCT No.: PCT/KR99/00817
§ 371 (c)(1),
(2), (4) Date: Aug. 22, 2000

(87) PCT Pub. No.: WO00/39867
PCT Pub. Date: Jul. 6, 2000

(30) Foreign Application Priority Data

Dec. 24, 1998 (KR) .................................. 98-58175

(51) Int. Cl.[7] ........................... H01M 2/02; H01M 6/10
(52) U.S. Cl. ............................... 429/94; 429/176
(58) Field of Search .............. 429/94, 176; H01M 2/02, H01M 6/10

(56) References Cited

U.S. PATENT DOCUMENTS

| 5,549,717 A | * | 8/1996 | Takeuchi et al. | 429/94 X |
| 5,556,722 A | * | 9/1996 | Narukawa et al. | 429/94 X |
| 5,803,933 A | * | 9/1998 | Kilb | 429/175 X |
| 6,083,640 A | * | 7/2000 | Lee et al. | 429/94 |
| 6,232,015 B1 | * | 5/2001 | Wyser | 429/176 |

FOREIGN PATENT DOCUMENTS

| JP | 6-352649 | * | 12/1994 | H01M/2/02 |
| JP | 10-284015 | * | 10/1998 | H01M/2/02 |

* cited by examiner

*Primary Examiner*—Stephen Kalafut
(74) *Attorney, Agent, or Firm*—Nixon Peabody LLP

(57) ABSTRACT

The present invention relates to a prismatic lithium ion battery, more particularly to a prismatic lithium ion battery, wherein jelly roll of a lithium ion battery is mounted and electrolyte is infused in a prismatic can. The present invention provides a prismatic lithium ion battery in which improved safety is provided to a battery itself as well as its battery pack by mounting a jelly roll into a prismatic can with surfaces with recessed portions so that battery volume change due to the electrode expansion and pressure rise inside the battery is restrained. Furthermore, a prismatic lithium ion battery of the present invention improves the cycle life characteristics of a battery by alleviating the jelly roll deformation caused by the expansion and contraction of a jelly roll of a lithium ion battery due to continuous charging and discharging. Accordingly, lithium metal can be uniformly and stably adsorbed in and detached from a jelly roll.

7 Claims, 5 Drawing Sheets

FIG.1
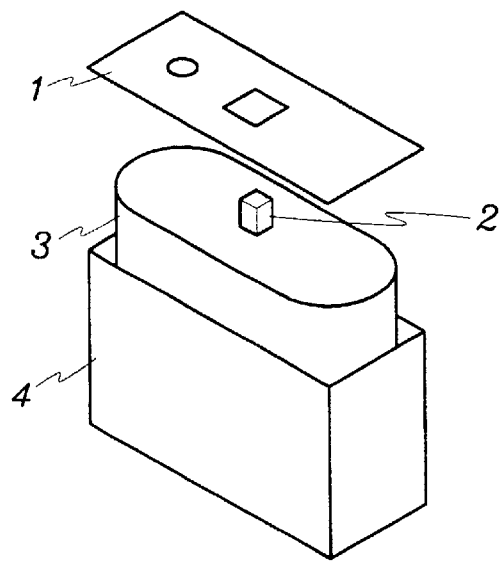
FIG.2
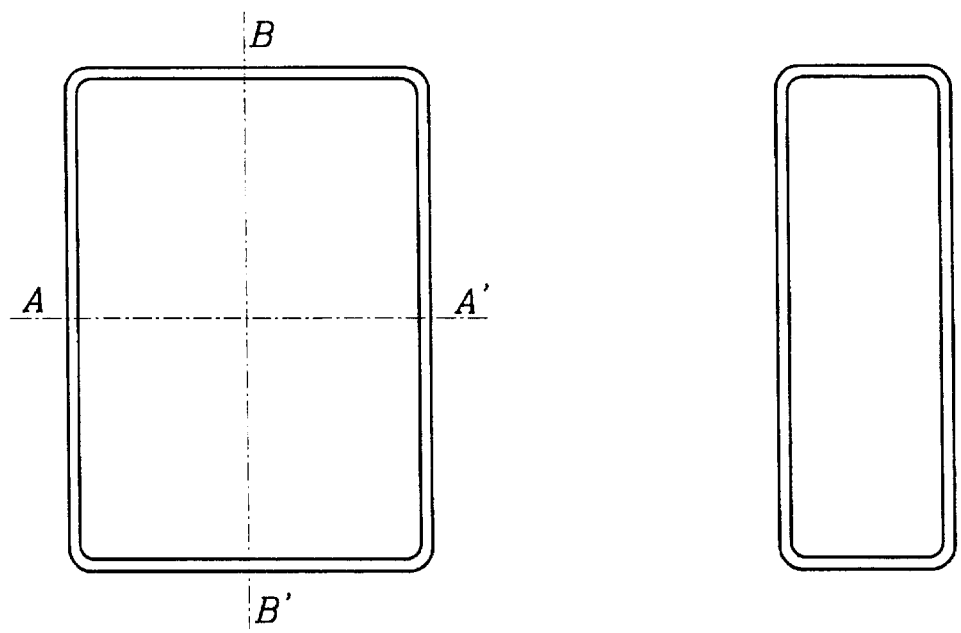
FIG.4
FIG.3
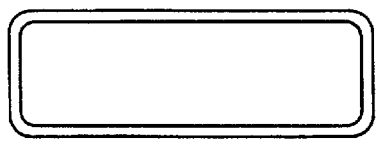

LITHIUM ION BATTERY USING PRISMATIC CAN WITH RECESSED SURFACES

CROSS REFERENCE TO RELATED APPLICATION

This application is based on application Ser. No. 98-58175 filed in the Korean Industrial Property Office on Dec. 24, 1998, the contents of which are incorporated here into by reference.

BACKGROUND OF THE INVENTION (a) Field of the Invention

The present invention relates to a prismatic lithium ion battery, more particularly to a prismatic lithium ion battery, wherein a jelly roll of a lithium ion battery is mounted and electrolyte is infused into a prismatic can.

(b) Description of the Related Art

The conventional cylindrical lithium ion battery is undergoing a transition into a rectangular shape for use in smaller and thinner portable electronic appliances while at the same time the battery used in such portable electronic appliances is being changed from a nickel hydrogen battery to a lithium ion battery.

However, when comparing prismatic lithium ion batteries with cylindrical lithium ion batteries, the prismatic battery packs have post-assembly charge and discharge cycles problems causing damage to themselves as well as the electronic appliance in which they are used. Additionally, during the initial charge and discharge these prismatic batteries generate gas so that pressure can build up in the battery. Furthermore, when the repeated charges and discharges cause electrode swelling, the external surface of the protective can is deformed so that there is a great amount of swelling with the result of deteriorating the safety characteristics of the battery.

Therefore, a method for restraining can swelling due to gas pressure or electrode expansion caused by charging and discharging is required for conventional prismatic battery cans.

SUMMARY OF THE INVENTION

It is an object of the present invention to provide a prismatic lithium ion battery which improves the safety of a battery itself as well as that of the battery pack by using a can which can withstand the internal pressure of a battery. This is done in order to restrain the swelling of a can surface so that battery volume changes due to electrode expansion and internal battery pressure increases are contained.

Furthermore, it is an other object of the present invention to improve the battery cycle life characteristics by alleviating jelly roll deformations caused by the expansion and contraction of a lithium ion battery jelly roll due to continuous charging and discharging so that the lithium metal can be uniformly and stably adsorbed in and detached from a jelly roll.

BRIEF DESCRIPTION OF THE DRAWING

The accompanying drawings, which are incorporated in and constitute a part of the specification, illustrate an embodiment of the invention, and together with the description, serve to explain the principles of the invention:

FIG. 1 is a schematic drawing outlining a lithium ion battery construction using the conventional prismatic can of the COMPARATIVE EXAMPLE, wherein 1 indicates 1 a cap for a prismatic can; 2 indicates an anode terminal; 3 indicates a jelly roll; and 4 indicates a prismatic can;

FIG. 2 is a front view of the conventional prismatic can of the COMPARATIVE EXAMPLE;

FIG. 3 is a linear cross-sectional view at section line A—A' of FIG. 2;

FIG. 4 is a linear cross-sectional view at section line B—B' of FIG. 2;

DETAILED DESCRIPTION OF THE PREFERRED EMBODIMENTS

Figure 5:
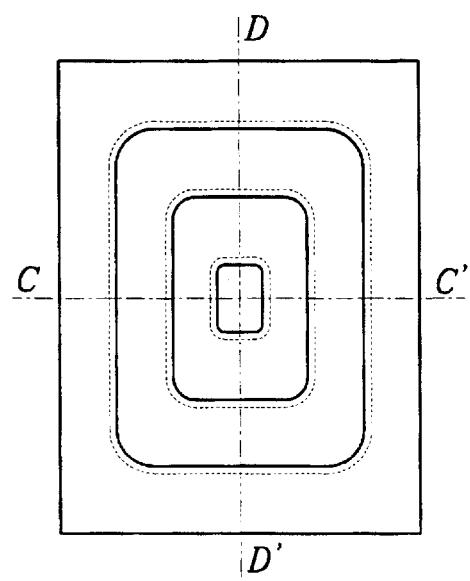
FIG. 5 is a front view of the prismatic can of EXAMPLE 1.
Figure 6:
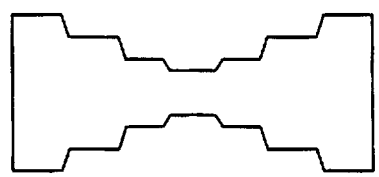
FIG. 6 is a linear cross-sectional view at section line C—C' of FIG. 5.
Figure 7:
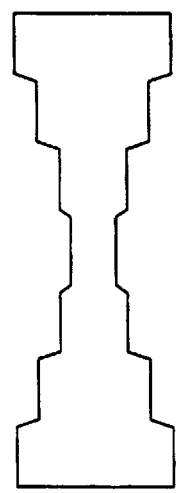
FIG. 7 is a linear cross-sectional view at section line D—D' of FIG. 5.

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The present invention provides a prismatic lithium ion battery which improves the safety of a battery itself as well as its battery pack by mounting a jelly roll in a prismatic can comprising recessed surfaces so that battery volume changes due to electrode expansion and battery internal pressure increased can be restrained.

The present invention is described in detail as follows.

The present invention provides a prismatic lithium ion battery comprising:

a) a jelly roll of a lithium ion battery;

b) electrolyte; and c) a prismatic can comprising surfaces containing one or more of recessed portions between both of the can's end parts in which the above jelly roll and electrolyte are received.

The recessed portions of the above c) are formed of one or more of stages between both end parts, wherein the stage height difference is from 0.1 to 30%, and more preferably from 0.5 to 10% of the battery thickness.

The prismatic can comprising a surface containing recessed portions between both end parts of the above c) is manufactured by pressing or curving a metal plate in a shape selected from the group consisting of a strip, round, rectangular, and uneven shapes as shown in FIG. 5 to FIG. 13.

The surface shapes of the above prismatic can are not necessarily limited to strip, round, and rectangular shapes and any shape can be accepted that can endure the pressure generated inside a battery and the volume expansion of a jelly roll.

The materials of the prismatic can of the above c) are selected from the group consisting of stainless steel, nickel plated steel, and aluminum alloy.

The flat surface of a conventional prismatic can is not able to withstand forces generated in a normal direction due to the battery volume expansion, and this results in surface warping. This is because the thin metal plates are made of materials such as aluminum alloy, stainless steel, and nickel plated steel. However a prismatic can comprising a surface with the recessed portions of the present invention is manufactured with a modified metal surface, wherein the metal surface forming the can consists of one or more of interior stages so that the stages are not deformed by enduring the externally directed normal forces caused by a battery internal volume expansion. Furthermore, the volumetric expansion of the mounted battery can also be restrained.

Additionally, if a prismatic can comprising a surface with recessed portions of the present invention is used, the battery jelly roll's outer most aluminum foil layer can be more solidly secured in the can. As a result, the contact with the can is increased, improving the battery conductivity so that the battery performance can be improved by decreasing the battery impedance value.

Furthermore, a prismatic can comprising a surface with recessed portions improves battery cycle life characteristics by alleviating the jelly roll deformation caused by the expansion and contraction of lithium ion battery electrodes due to continuous charging and discharging. Therefore, lithium metal can be uniformly and stably adsorbed in and detached from the jelly roll.

The EXAMPLES of the present invention as well as a COMPARATIVE EXAMPLE are described below. However, the following EXAMPLES are only for illustrating the present invention, which is not restricted to the following

EXAMPLES.

A positive electrode using lithium cobalt oxide active material, a negative electrode using carbon active material, and a jelly roll separated with olefin based electrolyte film, with an infused mixed electrolyte of ethylene carbonate, diethylene carbonate, and a lithium salt (LiPF$_6$) were inserted into a prismatic can, as shown in FIG. 1, having a width of 34 mm, a height of 48 mm, and a thickness of 10 mm made of aluminum plates with flat uniform surfaces as shown in FIGS. 2–4. The seams between can edges and can lids were then laser welded in order to manufacture prismatic lithium ion batteries.

Three of the above prismatic lithium ion batteries underwent four separate charge and discharge cycles with respective durations of one cycle, 50 cycles, 100 cycles, and 150 cycles controlled by a charging and discharging instrument under the charging and discharging condition of ½ C. Measurements of battery outer dimensions were recorded in Table 1, and after measuring the impedance, discharge capacity per number of cycles was recorded and is presented in FIG. 14.

Furthermore, an impact test according to the UL-1642 standard was performed in order to confirm the safety of a battery after the charging and discharging test.

The impact test was carried out in a way that produced an internal short circuit by dropping a 9 kg of weight onto the center of a battery from a 60 cm height.

Consequently, the battery gas vents automatically operated within one minute.

Example 1

Jelly rolls of the COMPARATIVE EXAMPLE were inserted into a prismatic cans having a width of 34 mm, a height of 48 mm, and a thickness of 10 mm with a surface having recessed portions made of an aluminum plate modified with a three stage pressing process of depths of 0.1 mm, 0.1 mm, and 0.05 mm as in FIG. 5. The jelly rolls were infused with an electrolyte, and then the seam between can edges and lids were laser welded in order to manufacture prismatic lithium ion batteries.

Figure 14:
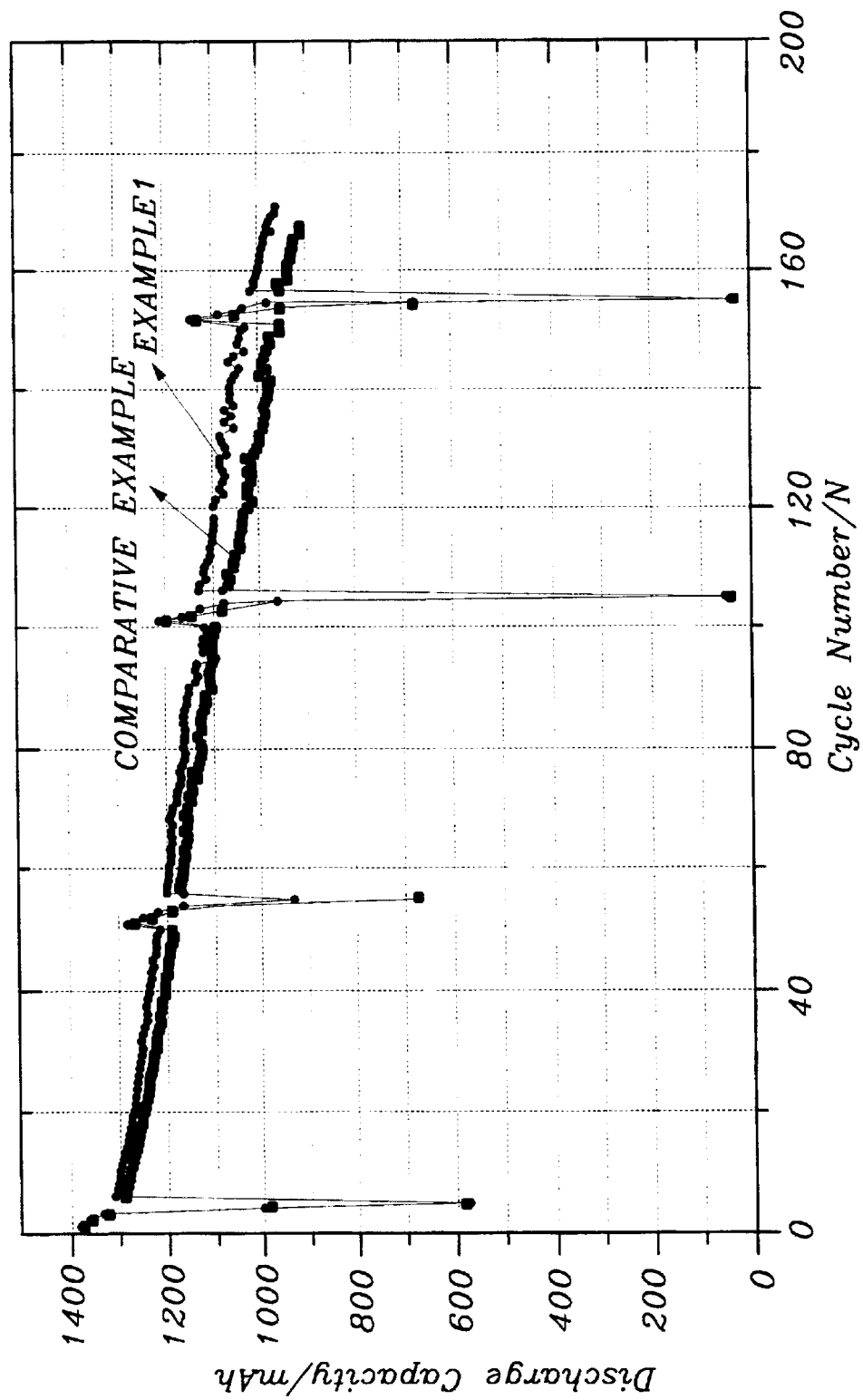
FIG. 14 is a graph presenting the discharge capacity according to the charge and discharge cycles of a lithium ion battery using the conventional prismatic can of the COMPARATIVE EXAMPLE and a lithium ion battery using a prismatic can of EXAMPLE 1 of the present invention.

The charging and discharging tests were performed on three prismatic lithium ion batteries manufactured as in COMPARATIVE EXAMPLE, and measurements of battery outer dimensions were recorded in Table 1, and after measuring the impedance, the discharge capacity per number of cycles was recorded and presented in FIG. 14.

The outer dimension changes for the batteries of Example 1 were lower than those of the prismatic lithium ion batteries of the COMPARATIVE EXAMPLE using conventional cans, and they continue to display equivalent results even as the number of cycle further progressed.

The results of impedance measurements showed that due to low battery resistance the electric conductivity of the batteries of Example 1 was better than that of prismatic lithium ion batteries of the COMPARATIVE EXAMPLE using unmodified conventional cans.

Furthermore, the discharge capacity per cycle number of the batteries of Example 1 decreased less than that of a prismatic lithium ion batteries of COMPARATIVE EXAMPLE using the conventional cans as in FIG. 14.

Furthermore, following an impact test as done with the COMPARATIVE EXAMPLE, the operation of the gas vent was delayed, or it did not operate for more than one minute. So, it could be inferred that the amount of gas generated from an internal short circuit due to the external impact was greatly decreased when compared to a battery using the conventional prismatic cans of Comparative Example.

TABLE 1

| | | | COMPARATIVE EXAMPLE | | | EXAMPLE 1 | | |
|---|---|---|---|---|---|---|---|---|
| Classification | | | Battery 1 | Battery 2 | Battery 3 | Battery 1 | Battery 2 | Battery 3 |
| Dimension change ratio (%) | Charge state | 1 cycle | 7.2 | 6.9 | 7.1 | 4.3 | 4.5 | 42 |
| | | 50 cycles | 7.3 | 6.8 | 7.1 | 4.4 | 4.3 | 4.1 |
| | | 100 cycles | 7.0 | 6.5 | 6.7 | 4.2 | 4.3 | 4.1 |

TABLE 1-continued

| | | COMPARATIVE EXAMPLE | | | EXAMPLE 1 | | |
|---|---|---|---|---|---|---|---|
| Classification | | Battery 1 | Battery 2 | Battery 3 | Battery 1 | Battery 2 | Battery 3 |
| | 150 cycles | 6.8 | 6.4 | 6.5 | 4.0 | 4.1 | 4.0 |
| Discharge state | 1 cycle | 3.6 | 3.3 | 3.4 | 2.0 | 21 | 2.0 |
| | 50 cycles | 3.6 | 3.3 | 3.2 | 1.9 | 2.1 | 2.0 |
| | 100 cycles | 3.7 | 3.4 | 3.1 | 1.9 | 1.9 | 2.0 |
| | 150 cycles | 3.7 | 3.2 | 3.1 | 1.8 | 1.8 | 1.9 |

Example 2

Figure 8:
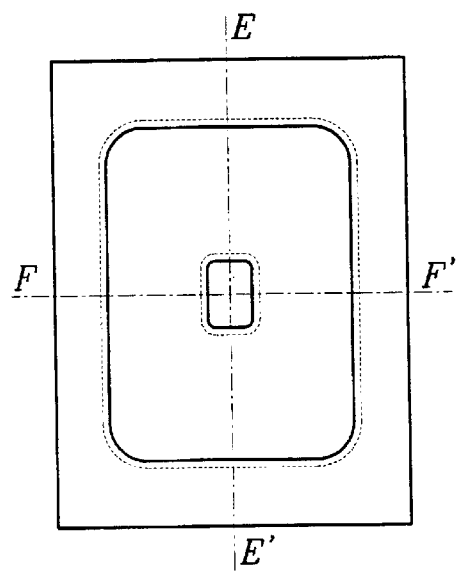
FIG. 8 is a front view of the prismatic can of EXAMPLE 2.
Figure 9:
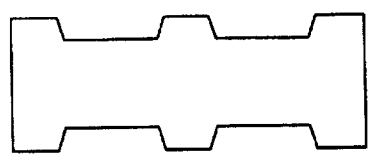
FIG. 9 is a linear cross-sectional view at section line E—E' of FIG. 8.
Figure 10:
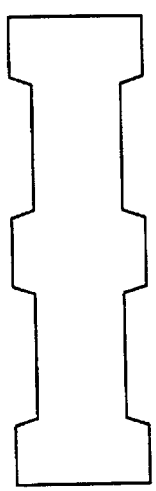
FIG. 10 is a linear cross-sectional view at section line F—F' of FIG. 8.

Jelly rolls as in the COMPARATIVE EXAMPLE were inserted into prismatic cans having a width of 34 mm, a height of 48 mm, and a thickness of 10 mm with a surface having recessed portions made of an aluminum plate modified by being pressed into an uneven shape having the depth of 0.3 mm as in FIG. 8. An electrolyte was then added, and then the seam between can edges and lids were laser welded in order to manufacture prismatic lithium ion batteries.

Charging and discharging tests were performed on the prismatic lithium ion batteries manufactured as in the COMPARATIVE EXAMPLE and measurements of battery outer dimensions were recorded. The outer dimension changes for the batteries of Example 2 were lower than those of the prismatic lithium ion batteries of the COMPARATIVE EXAMPLE using conventional cans, and they continue to display equivalent results even as the number of cycles further progressed as in EXAMPLE 1.

The results of impedance measurements showed that due to low battery resistance the electric conductivity of the batteries of Example 2 was better than that of prismatic lithium ion batteries of the COMPARATIVE EXAMPLE using the conventional prismatic cans.

Furthermore, following an impact test as done with the COMPARATIVE EXAMPLE, the operation of the gas vent was delayed, or it did not operate for more than one minute. So, it could be inferred that the amount of gas generated from an internal short circuit due to the external impact was greatly decreased when compared to a battery using the conventional prismatic cans of Comparative Example.

EXAMPLE 3

Figure 11:
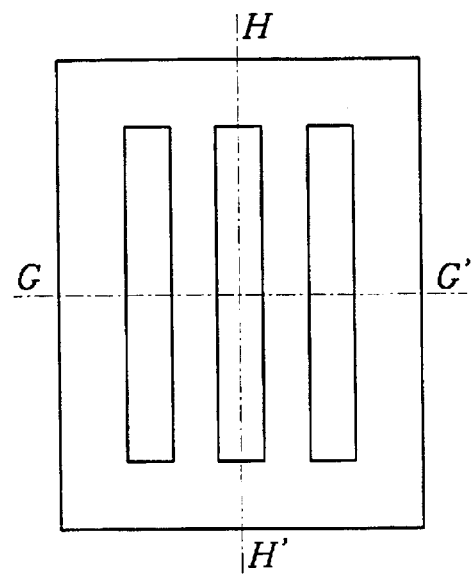
FIG. 11 is a front view of the prismatic can of EXAMPLE 3.
Figure 12:
FIG. 12 is a linear cross-sectional view at section line G—G' of FIG. 11.
Figure 13:
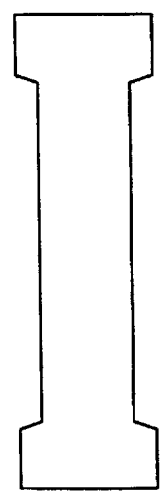
FIG. 13 is a linear cross-sectional view at section line H—H' of FIG. 11.

Jelly rolls as in the COMPARATIVE EXAMPLE were inserted into prismatic cans having a width of 34 mm, a height of 48 mm, and a thickness of 10 mm with a surface having recessed portions made of an aluminum plate modified by being pressed into a strip shape having the depth of 0.3 mm as in FIG. 11. An electrolyte was then added, and then the seam between can edges and lids were laser welded in order to manufacture prismatic lithium ion batteries.

Charging and discharging tests were performed on the prismatic lithium ion batteries manufactured as in the COMPARATIVE EXAMPLE and measurements of battery outer dimensions were recorded. The outer dimension changes for the batteries of Example 3 were lower than those of the prismatic lithium ion batteries of the COMPARATIVE EXAMPLE using conventional cans, and they continue to display equivalent results even as the number of cycle further progressed as in EXAMPLE 1.

The results of impedance measurements showed that due to low battery resistance the electric conductivity of the batteries of Example 3 was better than that of prismatic lithium ion batteries of the COMPARATIVE EXAMPLE using the conventional prismatic cans.

Furthermore, following an impact test as done with the COMPARATIVE EXAMPLE, the operation of the gas vent was delayed, or it did not operate for more than one minute. So, it could be inferred that the amount of gas generated from an internal short circuit due to the external impact was greatly decreased when compared to a battery using the conventional prismatic cans of COMPARATIVE EXAMPLE.

A prismatic lithium ion battery of the present invention provides improved safety to a battery itself as well as a battery pack by restraining the battery volume changes caused by internal battery pressure and electrode expansion. This is achieved since the jelly roll is mounted in a prismatic can comprising a surface with recessed portions.

Furthermore, a prismatic lithium ion battery of the present invention improves the battery cycle life characteristics by alleviating the jelly roll deformations due to the expansion and contraction of the jelly roll of a lithium ion battery caused by the continuous charging and discharging so that lithium metal is uniformly and stably adsorbed in and detached from a jelly roll.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A prismatic lithium ion battery comprising:
    a) a lithium ion battery having a jelly roll configuration;
    b) electrolyte; and
    c) a prismatic can comprising surfaces with one or more recessed portions between both end parts of said prismatic can in which the jelly roll and electrolyte are received, wherein said recessed portions prevent or reduce deformation of the prismatic can.

2. A prismatic lithium ion battery in accordance with claim 1, wherein the recessed portions of the prismatic can are formed of one or more stages between both end parts, and the height of the one or more stages is from 0.1 to 30% of the lithium ion battery thickness.

3. A prismatic lithium ion battery in accordance with claim 1, wherein the height of the one or more stages is from 0.5 to 10% of the lithium ion battery thickness.

4. A prismatic lithium ion battery in accordance with claim 2, wherein the number of the above stages is equal to three.

5. A prismatic lithium ion battery in accordance with claim 1, wherein the prismatic can comprising surfaces containing one or more recessed portions between both end parts of the prismatic can is manufactured by pressing or bending a metal plate in a surface shape selected from the group consisting of a strip, round, rectangular, and irregular shapes.

6. A prismatic lithium ion battery in accordance with claim 1, wherein the prismatic can comprising surfaces containing one or more recessed portions between both end parts of the prismatic can is manufactured by pressing or bending a metal plate in a rectangular surface shape.

7. A prismatic lithium ion battery in accordance with claim 1, wherein materials of the prismatic can are selected from the group consisting of stainless steel, nickel plated steel, and aluminum alloy.

* * * * *